(12) United States Patent
Koike

(10) Patent No.: US 12,103,351 B2
(45) Date of Patent: Oct. 1, 2024

(54) REAR SUSPENSION STRUCTURE

(71) Applicant: HONDA MOTOR CO., LTD., Tokyo (JP)

(72) Inventor: Akihiko Koike, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/472,459

(22) Filed: Sep. 22, 2023

(65) Prior Publication Data

US 2024/0100903 A1 Mar. 28, 2024

(30) Foreign Application Priority Data

Sep. 26, 2022 (JP) ................................. 2022-152397

(51) Int. Cl.
*B60G 21/05* (2006.01)
*B60G 21/055* (2006.01)

(52) U.S. Cl.
CPC ....... *B60G 21/052* (2013.01); *B60G 21/0551* (2013.01); *B60G 2200/24* (2013.01); *B60G 2204/41* (2013.01); *B60G 2206/20* (2013.01)

(58) Field of Classification Search
CPC .............. B60G 21/052; B60G 21/0551; B60G 2200/24; B60G 2204/41; B60G 2206/20; B60G 2204/18; B60G 2204/422; B60G 21/051
See application file for complete search history.

(56) References Cited

U.S. PATENT DOCUMENTS

2021/0008949 A1* 1/2021 Takahashi ............... B60G 7/001
2023/0302861 A1* 9/2023 Hirai ........................ B60G 7/02

FOREIGN PATENT DOCUMENTS

JP 2008-201241 A 9/2008

* cited by examiner

*Primary Examiner* — James A Shriver, II
*Assistant Examiner* — Matthew Joseph Ganci
(74) *Attorney, Agent, or Firm* — Rankin, Hill & Clark LLP

(57) ABSTRACT

A rear suspension structure includes left and right trailing arms, left and right hub carriers, and a lateral beam. Each hub carrier includes a front arm portion extending in a direction inward in the vehicle width direction and frontward of an axis of the rear wheels, and a rear arm portion extending rearward of the front arm portion. Each trailing arm has a rear end portion coupled to the hub carrier or the lateral beam via a first coupling portion that is a bushing. The lateral beam includes a left beam extending inward in the vehicle width direction from the rear arm portion disposed on a left side of the vehicle, a right beam extending inward in the vehicle width direction from the rear arm portion disposed on a right side of the vehicle, and left and right second coupling portions displaceably coupling the left beam and the right beam.

10 Claims, 13 Drawing Sheets

REAR SUSPENSION STRUCTURE

CROSS-REFERENCE TO RELATED APPLICATION

This application claims the benefit of foreign priority to Japanese Patent Application No. 2022-152397, filed on Sep. 26, 2022, which is incorporated by reference in its entirety.

TECHNICAL FIELD

The present invention relates to a rear suspension structure for supporting rear wheels of a vehicle.

BACKGROUND

For example, a torsion beam rear suspension structure is disclosed in JP 2008-201241 A. This rear suspension structure includes a pair of left and right trailing arms, and a cross beam extending in the vehicle width direction between the left and right and trailing arms. The cross beam is divided into a right beam and a left beam. Each of the left and right beams is rotatably connected via a rubber bushing having a rotation axis extending in the vehicle width direction as a rotation center.

In the torsion beam rear suspension structure disclosed in JP 2008-201241 A, when the vehicle body vibrates in the vertical direction without tilting in the vehicle width direction, the left and right trailing arms are displaced in the same phase. When the vehicle body tilts in the vehicle width direction, such as when the vehicle is turning, the left and right trailing arms are displaced in opposite phases to allow a torsion of the cross beam (the left beam and the right beam) by the elasticity of the rubber bushings.

In recent years, research and development for vehicle body rigidity that contributes to an increase in energy efficiency have been conducted to allow more people to secure access to affordable, reliable, sustainable, and advanced energy.

The torsion beam rear suspension structure disclosed in JP 2008-201241 A employs a structure that joins the left and right cross beams integrated with the corresponding trailing arms, so the amount of torsion of the left and right cross beams depends on the elasticity of the rubber bushings (hardness of the rubber bushings).

For this reason, it is necessary for the torsion beam rear suspension structure disclosed in JP 2008-201241 A to keep a good balance between the amount of torsion of the cross beams in the reverse phase and the amount of displacement of the trailing arms in the same phase.

The present invention has been made in view of the above-described circumstances. An object of the present invention is to provide a rear suspension structure that can keep a good balance between the amount of torsion of the cross beams and the amount of displacement of the trailing arms.

SUMMARY

To achieve the above object, an aspect of the present invention is to provide a rear suspension structure configured to support rear wheels of a vehicle, the rear suspension structure comprising: a pair of left and right trailing arms extending in a front-rear direction of the vehicle and each having a front end portion supported by the vehicle; a pair of left and right hub carriers each having a wheel support portion, by which a rear wheel is rotatably supported; and a lateral beam extending in a vehicle width direction of the vehicle, wherein each of the hub carriers includes a front arm portion that extends in a direction inward in the vehicle width direction and frontward of an axis of the rear wheels, and a rear arm portion that extends rearward of the front arm portion, the front arm portion is coupled to a front arm attachment portion provided in the trailing arm, the lateral beam connects the left and right rear arm portions, each of the left and right trailing arms has a rear end portion, and the rear end portion is coupled to at least one of the hub carrier and the lateral beam via a first coupling portion that is a bushing, and the lateral beam includes a left beam extending inward in the vehicle width direction from the rear arm portion disposed on a left side of the vehicle, a right beam extending inward in the vehicle width direction from the rear arm portion disposed on a right side of the vehicle, and a pair of left and right second coupling portions configured to displaceably couple the left beam and the right beam that are arranged one over another.

BRIEF DESCRIPTION OF THE DRAWINGS

The drawings described herein are for illustration purposes only and are not intended to limit the scope of the present invention in any way.

FIGS. 6A and 6B are schematic explanatory views, in which FIG. 6A shows a state in which an input of a lateral force is zero, and FIG. 6B shows toe-in characteristic when the lateral force is input.

DETAILED DESCRIPTION

Embodiments of the present invention will be described in detail with reference to the drawings as appropriate. In each of the drawings, directions such as front and rear refer to corresponding directions in a front-rear direction of a vehicle, directions such as left and right refer to corresponding directions in a vehicle width direction (right-left direction) of the vehicle, and directions such as upper and lower refer to corresponding directions in an upper-lower direction (vertical direction) of the vehicle.

Figure 1:
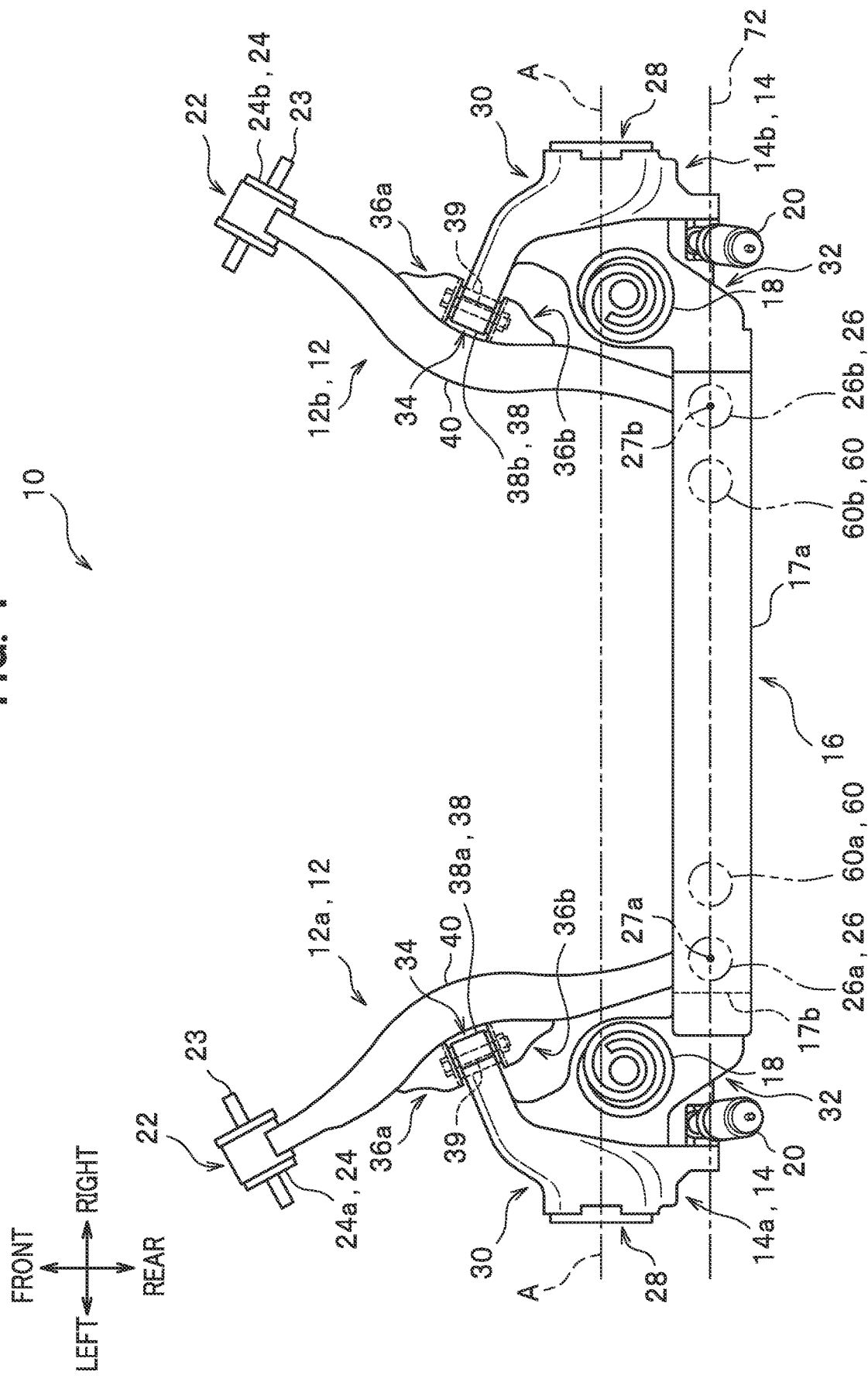
FIG. 1 is a plan view of a rear suspension to which a rear suspension structure according to one embodiment of the present invention is applied.

As shown in FIG. 1, a rear suspension structure according to one embodiment of the present invention is applied to a rear suspension 10 that supports rear wheels of a vehicle. The rear suspension 10 is configured to include a pair of left and right trailing arms 12a, 12b, a pair of left and right hub carriers 14a, 14b, a lateral beam 16, a pair of left and right coil springs 18, and dampers 20.

In this specification, when referring to both the pair of left and right trailing arms together, they are collectively referred to as "trailing arm(s) 12". On the other hand, when the trailing arms are referred to individually, the trailing arm located on the left side of the vehicle is referred to as a "trailing arm 12a" and the trailing arm located on the right side of the vehicle is referred to as a "trailing arm 12b". Similarly, when referring to both the pair of left and right hub carriers together, they are collectively referred to as "hub carrier(s) 14". On the other hand, when the hub carriers are referred to individually, the hub carrier located on the left side of the vehicle is referred to as a "hub carrier 14a" and the hub carrier located on the right side of the vehicle is referred to as a "hub carrier 14b".

The trailing arms 12 are each formed of a hollow body having a closed cross section therein. The trailing arms 12 are arranged in a V-shape in a plan view, in which the front sides thereof are extended outward in the vehicle width direction to become wider than the rear sides thereof (see FIG. 1).

A front end portion of each of the pair of left and right trailing arms 12a, 12b is provided with a vehicle body attachment portion 22, by which the front end portion is attached to a vehicle body member (not shown). The vehicle body attachment portion 22 is formed of an annular body. A pair of left and right first bushings 24a, 24b each including a rubber elastic body are fitted into the corresponding annular bodies.

Each of the first bushings 24a, 24b has a first fixing hole for fixing a first support shaft 23 that is fitted into the center of the first bushing 24a, 24b. The first support shaft 23 extends generally in the vehicle width direction through the first fixing hole. The first bushings 24a, 24b are attached to the vehicle body member (e.g., side sills, rear frame, etc.) via a bracket (not shown) or the like.

The vehicle body attachment portion 22 of the trailing arm 12 is coupled to the vehicle body member (e.g., side sills, rear frame, etc.) via the first support shaft 23 of the first bushing 24a, 24b so as to be swingable in the upper-lower direction of the vehicle. The first bushing 24a, 24b is described later in detail.

Figure 2:
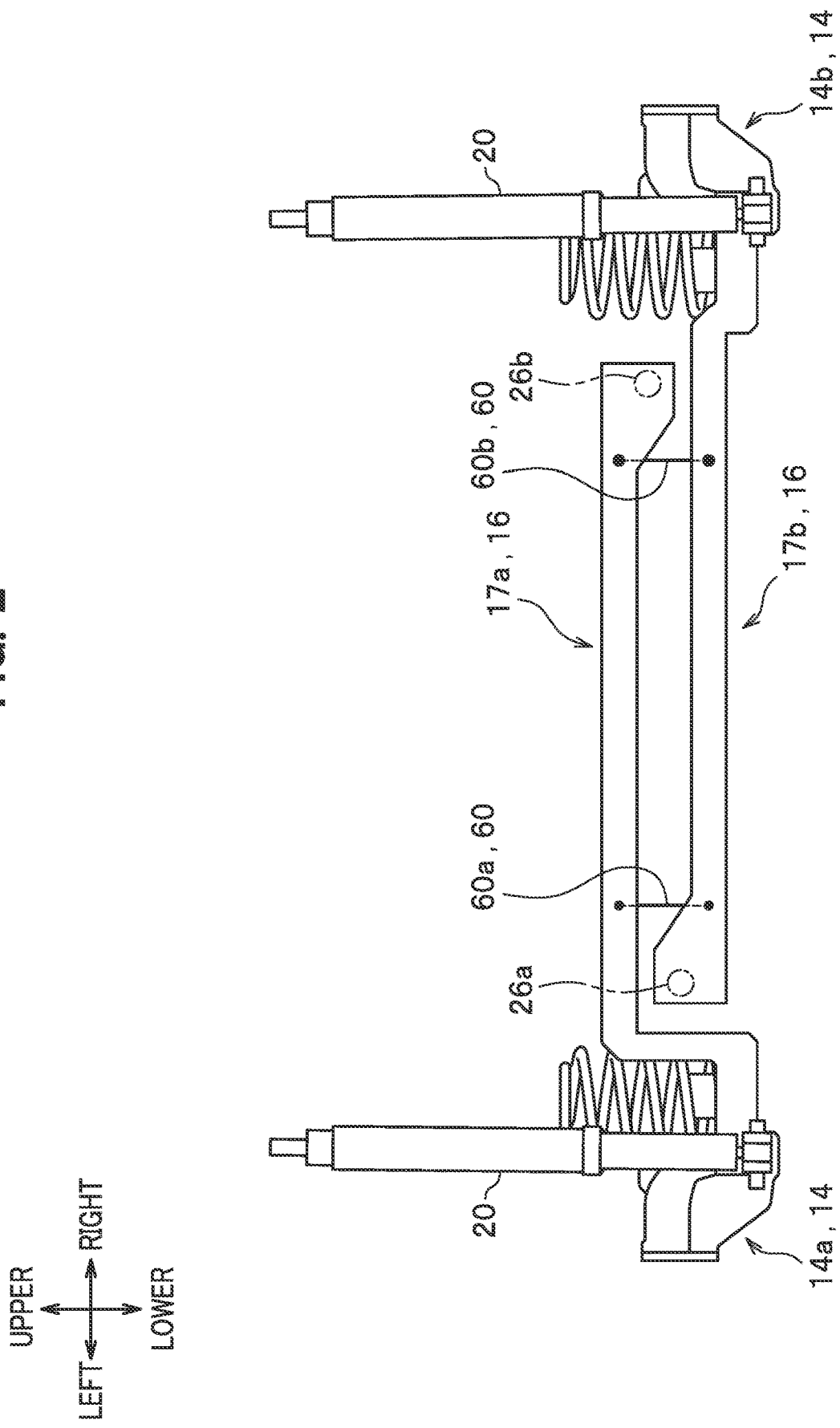
FIG. 2 is a partial schematic side view of the rear suspension shown in FIG. 1, as viewed from the rear side of a vehicle.
Figure 3:
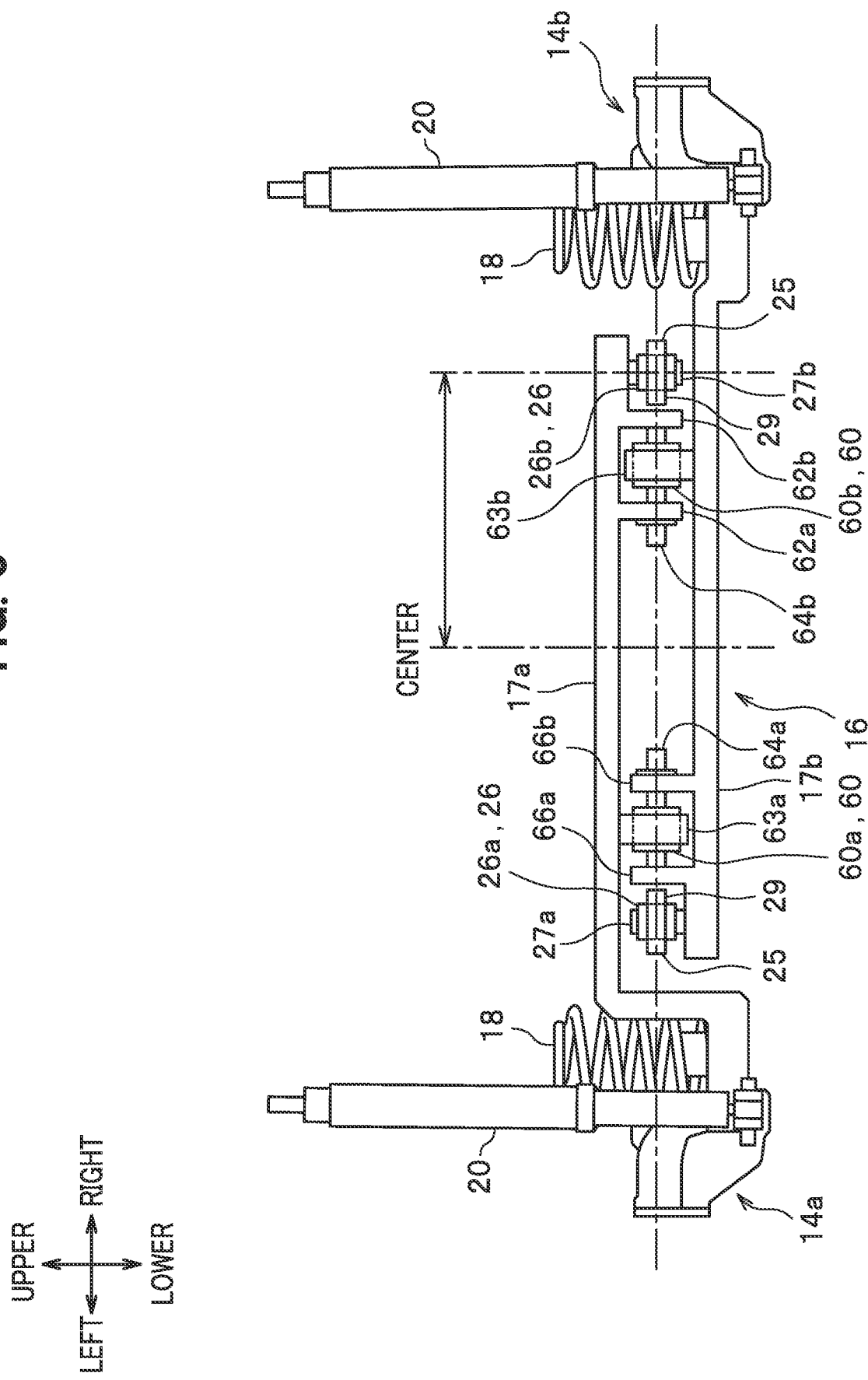
FIG. 3 is a side view of the rear suspension shown in FIG. 1, as viewed from the front side of the vehicle.

The pair of left and right trailing arms 12a, 12b extending in the front-rear direction of the vehicle have rear end portions 25 (see FIG. 3). The rear end portions 25 are coupled to lateral outer end portions of a left beam 17a and a right beam 17b that form the lateral beam 16 via a pair of left and right third bushings 26a, 26b as first coupling portions. Each of the pair of left and right third bushings 26a, 26b is fitted into an annular body 29 that is provided in the rear end portion 25 of the trailing arm 12a, 12b, and is displaceable by a third support shaft 27a, 27b that extends in the upper-lower direction of the vehicle. As shown in FIGS. 1 and 2 in combination, a rear end of the left trailing arm 12a is connected to a left end portion of the left beam 17a. A rear end of the right trailing arm 12b is connected to a right end portion of the right beam 17b.

According to this embodiment, as shown in FIG. 1, the front end portion (vehicle body attachment portion 22) of the trailing arm 12 is inclined outward in the vehicle width direction as viewed in a plan view such that the front end portion is positioned further outward than the rear end portion 25. In other words, the pair of left and right trailing arms 12a, 12b form a substantially V-shape arrangement in plan view.

Although in this embodiment, the rear end portions 25 of the trailing arms 12a, 12b are coupled to the left beam 17a and the right beam 17b of the lateral beam 16 via the pair of left and right third bushings 26a, 26b, the present invention is not limited to this specific configuration. For example, the rear end portions 25 of the trailing arms 12a, 12b may be coupled to the left and right hub carriers 14a, 14b. Note that the lateral beam 16 is described later in detail.

Each of the hub carriers 14 is formed of a structural body that holds a hub (not shown) configured to support a wheel with a tire (tire and wheel) while allowing the wheel with the tire to rotate. The hub carrier 14 includes a wheel support portion 28 by which a rear tire is rotatably supported (see FIG. 1).

Further, as shown in FIG. 1, the hub carrier 14 is configured to be two-pronged toward the front side and the rear side of the vehicle. Specifically, the hub carrier 14 includes a front arm portion 30 that extends in a direction inward of the vehicle and frontward of the axis A of the rear wheels, and a rear arm portion 32 that extends rearward of the front arm portion 30. In this embodiment, the front arm portion 30 and the rear arm portion 32 are integrally formed. Note that the front arm portion 30 and the rear arm portion 32 may be manufactured as separate bodies, and integrally coupled to each other.

In this embodiment, as shown in FIG. 1, the left beam 17a and the right beam 17b of the lateral beam 16 are located rearward of the axis A of the rear wheels. However, the present invention is not limited to this specific configuration. For example, as shown in another embodiment illustrated in FIG. 12, the left beam 17a and the right beam 17b of the lateral beam 16 are located frontward of the axis A of the rear wheels.

As shown in FIG. 1, the front arm portions 30 are coupled to the trailing arms 12a, 12b via front arm attachment portions 34 provided in substantially center portions of the trailing arms 12a, 12b. Specifically, a front end of the front arm portion 30 is pivotally attached to a pair of attachment pieces 36a, 36b fixed to the trailing arms 12a, 12b via a pair of left and right second bushings 38a, 38b. Each of the second bushings 38a and 38b has a second fixing hole for fixing a second support shaft 39 that is fitted in the center of the second bushing 38a, 38b. The second support shaft 39 generally extends in the front-rear direction of the vehicle via the second fixing hole. The second bushings 38a, 38b are disposed generally in the center of the trailing arms 12a, 12b in the front-rear direction of the vehicle (see FIG. 1).

As shown in FIG. 1, each of the front arm attachment portions 34 includes the pair of attachment pieces 36a, 36b provided on each trailing arm 12a, 12b, the second bushing 38a, 38b attached to the front end portion, and the second support shaft 39 fitted into the second bushing 38a, 38b and supported between the pair of attachment pieces 36a, 36b. To be more specific, each of the trailing arms 12a, 12b includes a curved portion 40 that is bent inward in the vehicle width direction. The pair of attachment pieces 36a, 36b arranged opposite to each other are provided laterally outward of the curved portion 40 in the vehicle width direction. The lateral beam 16 extends in the vehicle width direction and is configured to connect the left and right rear arm portions 32. In this embodiment, a lateral inner end portion of the rear arm portion 32 of the left hub carrier 14a in the vehicle width direction is integrally formed with a lateral outer end portion of the left beam 17a of the lateral beam 16 that extends in the vehicle width direction. Similarly, a lateral inner end portion of the rear arm portion 32 of the right hub carrier 14b in the vehicle width direction is integrally formed with a lateral outer end portion of the right beam 17b of the lateral beam 16 that extends in the vehicle width direction.

As shown in FIG. 1, the trailing arms 12a, 12b are arranged to have an inclined angle such that the front end portions (vehicle body attachment portions 22) are positioned further outward than the rear end portions 25, and thus the trailing arms 12a, 12b extend outward in the vehicle width direction as viewed in a plan view.

As shown in FIGS. 2 and 3, the lateral beam 16 includes the left beam 17a, the right beam 17b, the pair of left and right third bushings (a pair of left and right first coupling portions) 26a and 26b, and a pair of left and right fourth bushings (a pair of left and right second coupling portions) 60a and 60b.

The left beam 17a is located on the upper side of the lateral beam 16 and extends inward in the vehicle width direction from the upper portion of the hub carrier 14a that is located on the left side of the vehicle. The right beam 17b is located on the lower side of the lateral beam 16 and extends inward in the vehicle width direction from the lower portion of the hub carrier 14b that is located on the right side of the vehicle. The left beam 17a and the right beam 17b are positioned one over the other in the upper-lower direction of the vehicle. The pair of left and right third bushings (bushings) 26a, 26b serve as a pair of left and right first coupling portions. The pair of left and right third bushings 26a, 26b couple the rear end portions 25 of the left and right trailing arms 12a, 12b to the left beam 17a and to the right beam 17b. The pair of left and right fourth bushings (different bushings) 60a, 60b serve as a pair of left and right second coupling portions. The pair of left and right fourth bushings 60a, 60b displaceably couple the left beam 17a and the right beam 17b.

In this specification, when referring to both the pair of left and right third bushings 26a, 26b together, they are collectively referred to as "third bushing(s) 26". Similarly, when referring to both the pair of left and right fourth bushings 60a, 60b together, they are collectively referred to as "fourth bushing(s) 60"

In this embodiment, the rear arm portion 32 of the hub carrier 14a that is located on the left side of the vehicle is integrally formed with the left beam 17a, and the rear arm portion 32 of the hub carrier 14b that is located on the right side of the vehicle is integrally formed with the right beam 17b. However, the present invention is not limited to this specific configuration. For example, the left hub carrier 14a, the right hub carrier 14b, the left beam 17a, and the right beam 17b may be manufactured as separate bodies, and they are integrally coupled together by welding or the like.

As shown in FIG. 3, the first coupling portions include the third bushing 26b (third bushing located on the other side) that is provided on the lower surface of the lateral outer end portion of the left beam 17a proximate to the right hub carrier 14b and is supported along the upper-lower direction via the third support shaft 27b, and the third bushing 26a (third bushing located on one side) that is provided on the upper surface of the lateral outer end portion of the right beam 17b proximate to the left hub carrier 14a and is supported along the upper-lower direction via the third support shaft 27a.

As shown in FIG. 3, the second coupling portions include the fourth bushing 60a (fourth bushing located on one side) and the fourth bushing 60b (fourth bushing located on the other side) that are arranged between the center of the left and right beams 17a, 17b in the vehicle width direction and the first coupling portions (the third bushing 26a located on one side and the third bushing 26b located on the other side). The fourth bushing 60b located on the other side includes a fourth support shaft 64b located on the other side, and an external fitting block 63b. The fourth support shaft 64b is supported along the vehicle width direction by a pair of support pieces 62a, 62b provided on the lower surface of the left beam 17a. The external fitting block 63b is provided on the upper surface of the right beam 17b and is fitted onto the external surface of the fourth bushing 60b. The fourth bushing 60a located on one side includes a fourth support shaft 64a located on one side, and an external fitting block 63a. The fourth support shaft 64a is supported along the vehicle width direction by a pair of support pieces 66a, 66b provided on the upper surface of the right beam 17b. The external fitting block 63a is provided on the lower surface of the left beam 17a and is fitted onto the external surface of the fourth bushing 60a. As shown in FIG. 3, the second coupling portions (the fourth bushing 60a located on one side and the fourth bushing 60b located on the other side) are located closer to the first coupling portions (the third bushing 26a located on one side and the third bushing 26b located on the other side) than the center in the vehicle width direction (the center of the left and right beams 17a, 17b in the vehicle width direction).

Figure 4:
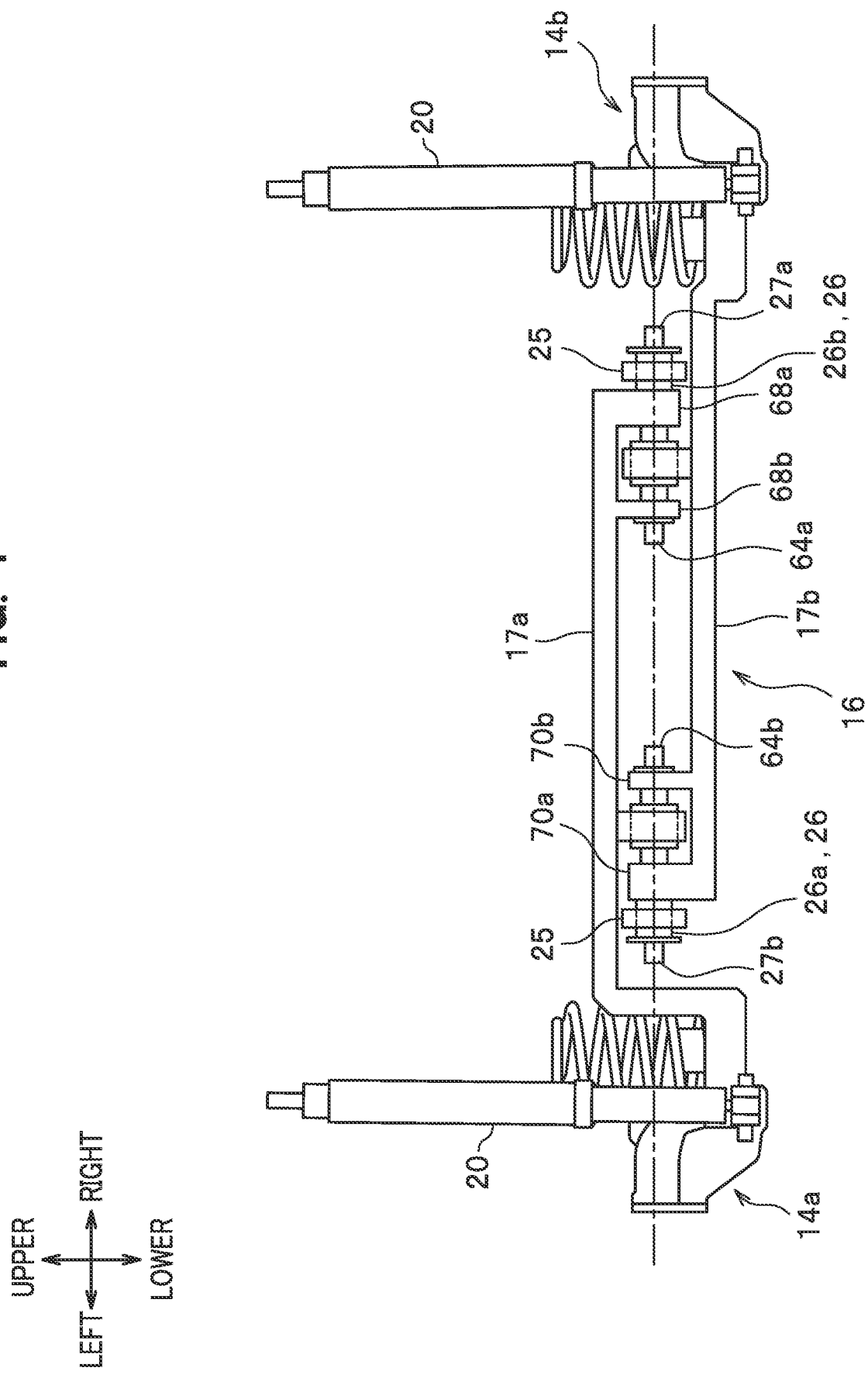
FIG. 4 is a side view illustrating a modification of first coupling portions and second coupling portions shown in FIG. 3.

Next, a modification of the first and second coupling portions is shown in FIG. 4. In this modification, as seen in FIG. 4, the support piece 68a provided on the lower surface of the lateral outer end portion of the left beam 17a and the support piece 70a provided on the upper surface of the lateral outer end portion of the right beam 17b are made thicker in thickness as compared with other support pieces 68b, 70b that are adjacent to and opposite to the support pieces 68a, 70a. The third support shaft 27a located on one side and the third support shaft 27b located on the other side are inserted into the thick support pieces 68a, 70a from outer side in the vehicle width direction and supported by the support pieces 68a, 70a along the vehicle width direction. The third support shaft 27a located on one side and the third support shaft 27b located on the other side serve as the first coupling portions. This modification differs from the above embodiment in that the support shafts 27a, 27b, 64a, 64b at the pair of left and right third bushing 26a, 26b as the first coupling portions and at the pair of left and right fourth bushing 60a, 60b as the second coupling portions are coaxially arranged in the vehicle width direction.

According to this modification, if a stabilizer 94 is provided as illustrated, for example, in another embodiment in FIG. 13 to be described later, a load in the upper-lower direction of the vehicle is input to the pair of left and right third bushings 26a, 26b and the pair of left and right fourth bushings 60a, 60b while maintaining a phase reversal between the left side and the right side. As a result, the modification shown in FIG. 4 has the advantage of easily enhancing the effect of the stabilizer 94.

According to the embodiment of the present invention, a relative axis of rotation 72 of the hub carriers 14 is formed (see FIG. 1) by connecting the center of the third support shaft 27a of the third bushing 26a located on one side along the vehicle width direction and the center of the third support shaft 27b of the third bushing 26b located on the other side along the vehicle width direction. In this embodiment, the pair of left and right first coupling portions and the pair of left and right second coupling portions are arranged on the relative axis of rotation 72. Operation and advantageous effects of this configuration will be described later in detail.

As shown in FIG. 1, according to this embodiment, each of the coil springs 18 and the corresponding damper 20 are not arranged coaxially. The coil springs 18 and the dampers 20 are arranged on different axes that are located rearward of the axis A. In this case, the coil spring 18 is arranged frontward of the damper 20 and close to the axis A, and the damper 20 is arranged rearward of the coil spring 18. Note that the coil spring 18 and the damper 20 may be coaxially arranged such that the coil spring 18 is wound around the external portion of the damper 20.

The first bushings 24, the second bushings 38, the third bushings 26, and the fourth bushings 60 have substantially the same configuration. For example, each of the bushings 24, 38, 26, 60 is configured to include an outer tube having a cylindrical configuration, an inner tube arranged coaxially in the outer tube and having a through hole that extends through the center of the inner tube along its axial direction, a rubber elastic body provided between the inner surface of the outer tube and the outer surface of the inner tube and configured to elastically couple the outer tube and the inner tube to each other, and the support shaft 23, 39, 27, 64 that is fitted into and fixed to the through hole of the inner tube along the axial direction thereof. Each of the bushings 24, 38, 26, 60 is configured such that a vibration-proofing effect is exerted based on elastic deformation of the rubber elastic body.

The rear suspension 10 according to this embodiment is basically configured as described above, and the operation and advantageous effects of the rear suspension 10 are described below.

In this embodiment, each of the pair of left and right hub carriers 14a, 14b includes the front arm portion 30 that extends in a direction inward of the vehicle and frontward of the axis A of the rear wheels, and the rear arm portion 32 that extends rearward of the front arm portion 30. The left and right trailing arms 12a, 12b extending in the front-rear direction of the vehicle have rear end portions 25, and the rear end portions 25 are coupled to the lateral beam 16 via the pair of left and right third bushings (bushings) 26a, 26b that serve as the first coupling portions. The lateral beam 16 includes the left beam 17a extending inward in the vehicle width direction from the hub carrier 14a that is located on the left side of the vehicle, the right beam 17b extending inward in the vehicle width direction from the hub carrier 14b that is located on the right side of the vehicle, and the second coupling portions configured to displaceably couple the left beam 17a and the right beam 17b.

In this embodiment, providing the pair of left and right second coupling portions configured to displaceably couple the left beam 17a and the right beam 17b that are formed separately on the left side and the right side of the vehicle allows the left and right trailing arms 12a, 12b to displace in opposite phases when the vehicle body tilts in the vehicle width direction during vehicle turning or the like. Further, in this embodiment, the left and right trailing arms 12a, 12b can be displaced in the same phase via the pair of left and right first coupling portions (the third bushing 26a located on one side and the third bushing 26b located on the other side) that are configured to couple the rear end portions 25 of the left and right trailing arms 12a, 12b to the lateral beam 16. In this embodiment, this configuration allows for a control in which the amount of torsion in the lateral beam 16 and the amount of displacement in the trailing arms 12 are properly balanced (reconciled or synchronized). As a result, it becomes feasible to achieve a rear suspension structure that is not reliant on the elasticity or hardness of the rubber bushings.

As shown in FIG. 3, the pair of left and right second coupling portions (the fourth bushing 60a located on one side and the fourth bushing 60b located on the other side) are arranged between the center of the left and right beams 17a, 17b in the vehicle width direction and the first coupling portions (the third bushing 26a located on one side and the third bushing 26b located on the other side). In this embodiment, not only the first coupling portions configured to couple the rear end portions 25 of the left and right trailing arms 12a, 12b to the lateral beam 16, but also the second coupling portions configured to couple the left beam 17a and the right beam 17b together, are arranged between the center of the left and right beams 17a, 17b and the first coupling portions located along the vehicle width direction. This enables the trailing arms 12 and the lateral beam 16 to be coupled more tightly.

According to this embodiment, as shown in FIG. 3, the second coupling portions are arranged closer to the first coupling portions than the center in the vehicle width direction (the center of the left and right beams 17a, 17b in the vehicle width direction). This enables the trailing arms 12 and the lateral beam 16 to be coupled even more tightly.

In this embodiment, the pair of left and right second coupling portions are formed of the fourth bushing 60a located on one side and the fourth bushing 60b located on the other side. The fourth bushing 60a located on one side includes the fourth support shaft 64a located on one side; the fourth support shaft 64a is supported along the vehicle width direction by the pair of support pieces 66a, 66b provided on the upper surface of the right beam 17b. The fourth bushing 60b located on the other side includes the fourth support shaft 64b located on the other side; the fourth support shaft 64b is supported along the vehicle width direction by the pair of support pieces 62a, 62b provided on the lower surface of the left beam 17a.

In this embodiment, the fourth support shaft 64a located on one side and the fourth support shaft 64b located on the other side that are respectively provided on the fourth bushing 60a located on one side and the fourth bushing 60b located on the other side of the second coupling portions are arranged along the vehicle width direction. This allows for a rigid coupling in the front-rear direction and the upper-lower direction of the vehicle and a flexible coupling along the vehicle width direction.

In this embodiment, the left beam 17a and the right beam 17b are located rearward of the axis A of the rear wheels. According to this embodiment, this arrangement makes it possible to enlarge a space at the rear side of the vehicle, so that the installation space for a battery or other equipment can be increased.

In this embodiment, the relative axis of rotation 72 of the hub carriers 14 is formed by connecting the center of the third support shaft 27a of the third bushing 26a located on one side along the vehicle width direction and the center of the third support shaft 27b of the third bushing 26b located on the other side along the vehicle width direction. In this embodiment, the pair of left and right first coupling portions and the pair of left and right second coupling portions are arranged on the relative axis of rotation 72.

According to this embodiment, the third support shafts 27a, 27b of the third bushings 26a, 26b as the first coupling portions and the fourth support shafts 64a, 64b of the fourth bushings 60a, 60b as the second coupling portions are arranged on the relative axis of rotation 72 of the hub carriers 14, so that a torsional moment is not generated at the coupling portions between the rear arm portions 32 of the left and right hub carriers 14a, 14b and the left beam 17a and the right beam 17b, respectively. As a result, the rigidity and the strength required at the coupling portions between the rear arm portions 32 of the left and right hub carriers 14a, 14b and the left and right beams 17a, 17b can be reduced. This can improve the durability of the rear suspension 10 and achieve the weight reduction.

Figure 5A:
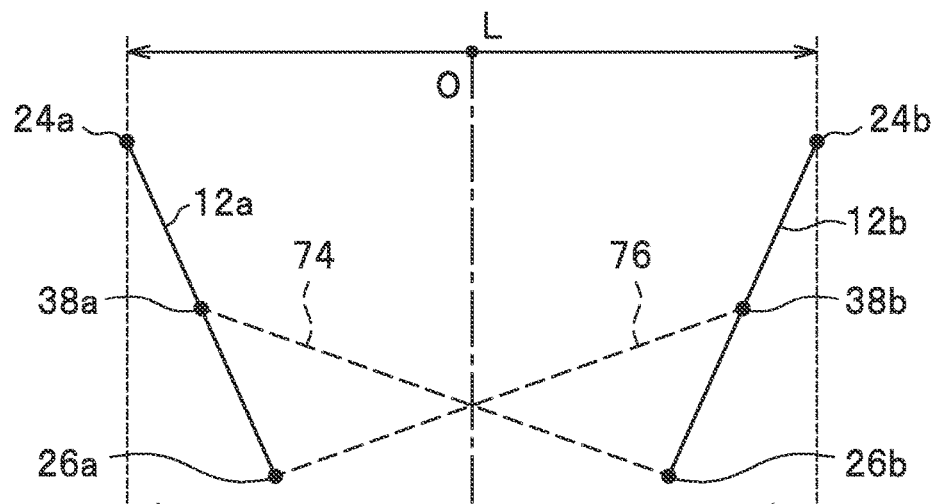
FIGS. 5A to 5C are schematic explanatory views used to explain the action of imaginary links.
Figure 5B:
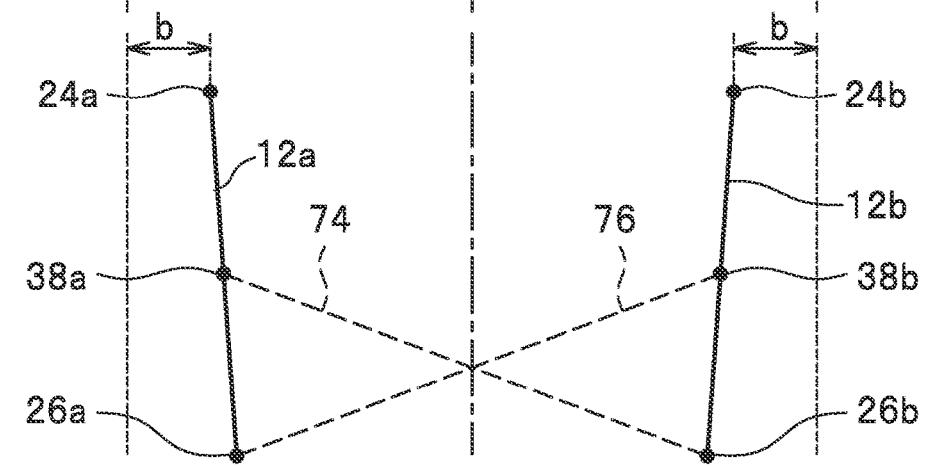
Figure 5C:
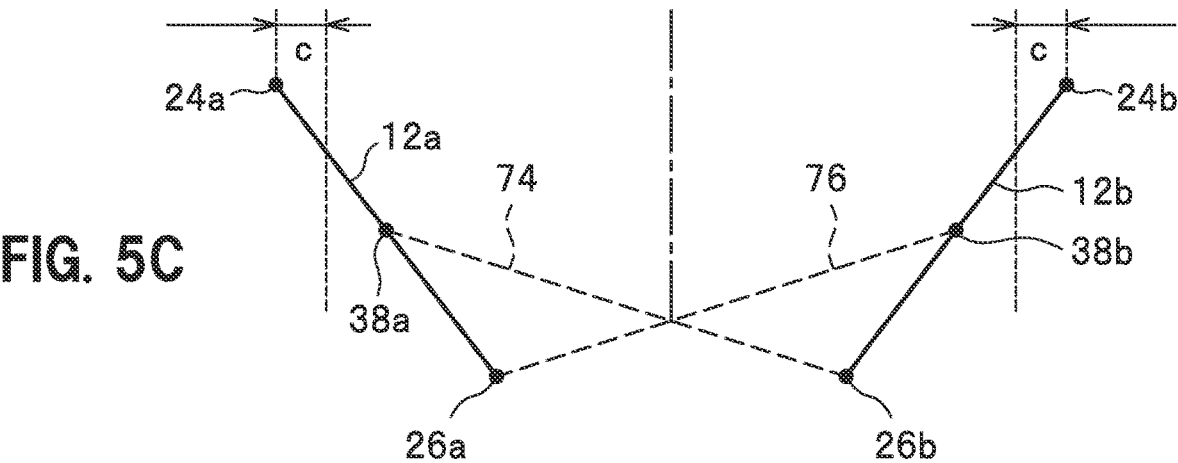

As seen in FIGS. 5A to 5C, the rear suspension structure according to this embodiment includes the pair of left and right first bushings 24a, 24b configured to attach the front end portions of the pair of left and right trailing arms 12a, 12b to the vehicle body member (not shown), the pair of left and right third bushings 26a, 26b configured to attach the rear end portions 25 of the pair of left and right trailing arms 12a, 12b to the lateral beam 16 (the left beam 17a and the right beam 17b), and the pair of left and right second bushings 38a, 38b configured to attach the front arm portions 30 of the left and right hub carriers 14a, 14b to middle portions of the left and right trailing arms 12a, 12b via the front arm attachment portions 34. Herein a first imaginary link 74 is assumed, in which the second bushing 38a located on one side provided at the middle portion of the left trailing arm 12a and the third bushing 26b located on the other side provided at the rear end portion 25 of the right trailing arm 12b are connected by an imaginary line. Similarly, a second imaginary link 76 is assumed, in which the second bushing 38b located on the other side provided at the middle portion of the right trailing arm 12b and the third bushing 26a located on one side provided at the rear end portion of the left trailing arm 12a are connected by an imaginary line. The first imaginary link 74 and the second imaginary link 76 intersect each other at the center O in the vehicle width direction.

This embodiment has an advantageous effect in which the width dimension L between the front end portions of the left and right trailing arms 12a, 12b can be enlarged or reduced as desired by providing the first imaginary link 74 and the second imaginary link 76. For example, it is assumed that the width dimension between the front end portions of the left and right trailing arms 12a, 12b in the state shown in FIG. 5A is dimension L. In this case, dimension 2b is reduced in the state shown in FIG. 5B, resulting in the width dimension (L−2b). Further, dimension 2c is enlarged in the state shown in FIG. 5C, resulting in the width dimension (L+2c). Note that the position of the center O remains unchanged in all of the states depicted in FIGS. 5A to 5C.

As described above, according to this embodiment, the degree of freedom of the width dimension L between the front end portions of the left and right trailing arms 12a, 12b can be increased by providing the pair of left and right second bushings 38a, 38b and the pair of left and right third bushings 26a, 26b that constitute the first imaginary link 74 and the second imaginary link 76, respectively. As a result, according to this embodiment, it is possible to achieve both high lateral rigidity and a degree of freedom that allows easy displacement from the same phase condition to the opposite phase condition (degree of freedom for opposite phase movement). This can contribute to stabilizing the vehicle's behavior.

Figure 6A:
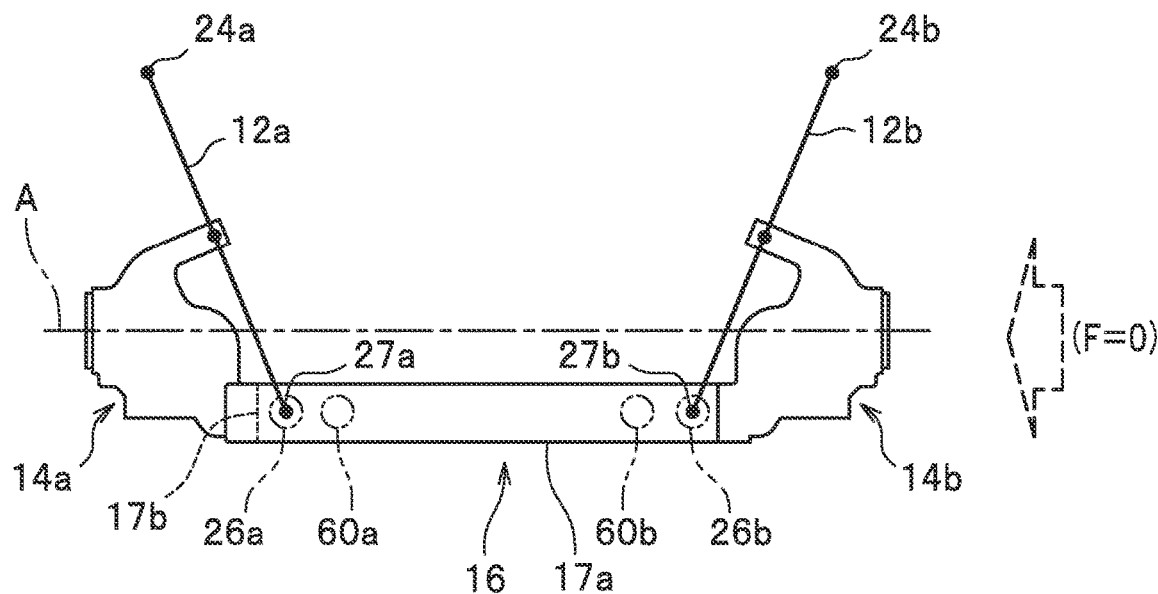
Figure 6B:
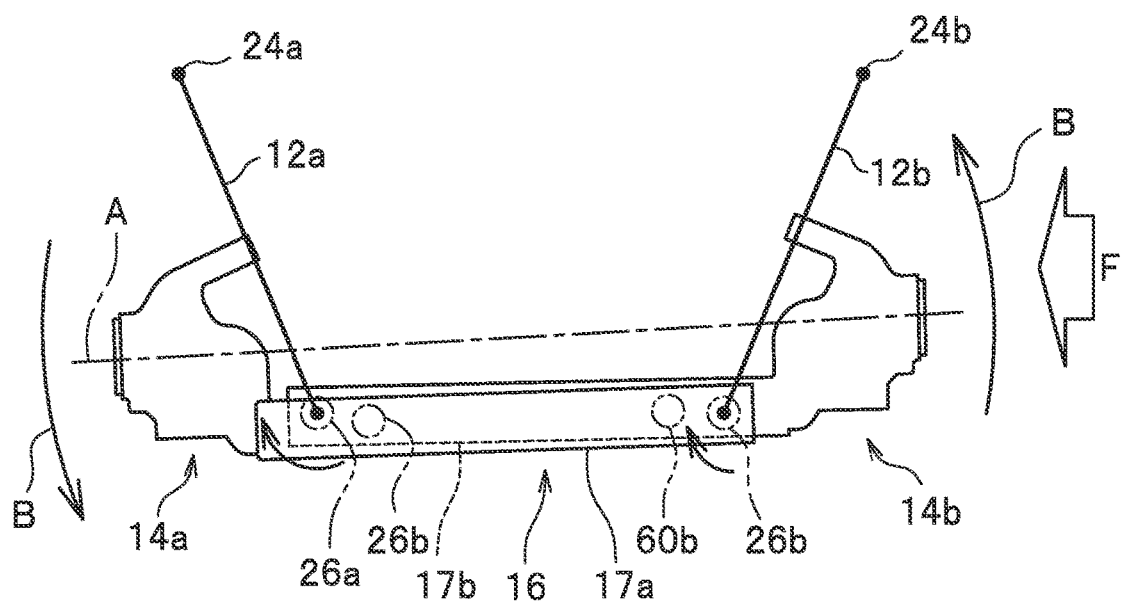

FIG. 6A shows a state in which a lateral force inputted to the rear wheel is zero (F=0), and FIG. 6B shows a state in which a lateral force F is inputted from the right rear wheel. As shown in FIG. 6B, when a lateral force F is inputted to the right rear wheel, the lateral force F is transmitted to the left rear wheel through the left beam 17a and the right beam 17b that constitute the lateral beam 16. When the lateral force F is transmitted from the right rear wheel to the left rear wheel, a force in the clockwise direction as indicated by the arrow acts on the third bushing 26b located on the other side that is the first coupling portion, and a force in the clockwise direction as depicted by the arrow acts on the third bushing 26a located on one side that is the first coupling portion. This causes the axis A of the left and right rear wheels to tilt frontward on the outer wheel side and rearward on the inner wheel side in the direction as indicated by arrows B, thereby imparting a characteristic (rear toe-in) in which the tire on the outer wheel side (the tire on the right side in the drawing) faces in the toe-in direction.

Other embodiments of the present invention are described below.

Figure 7:
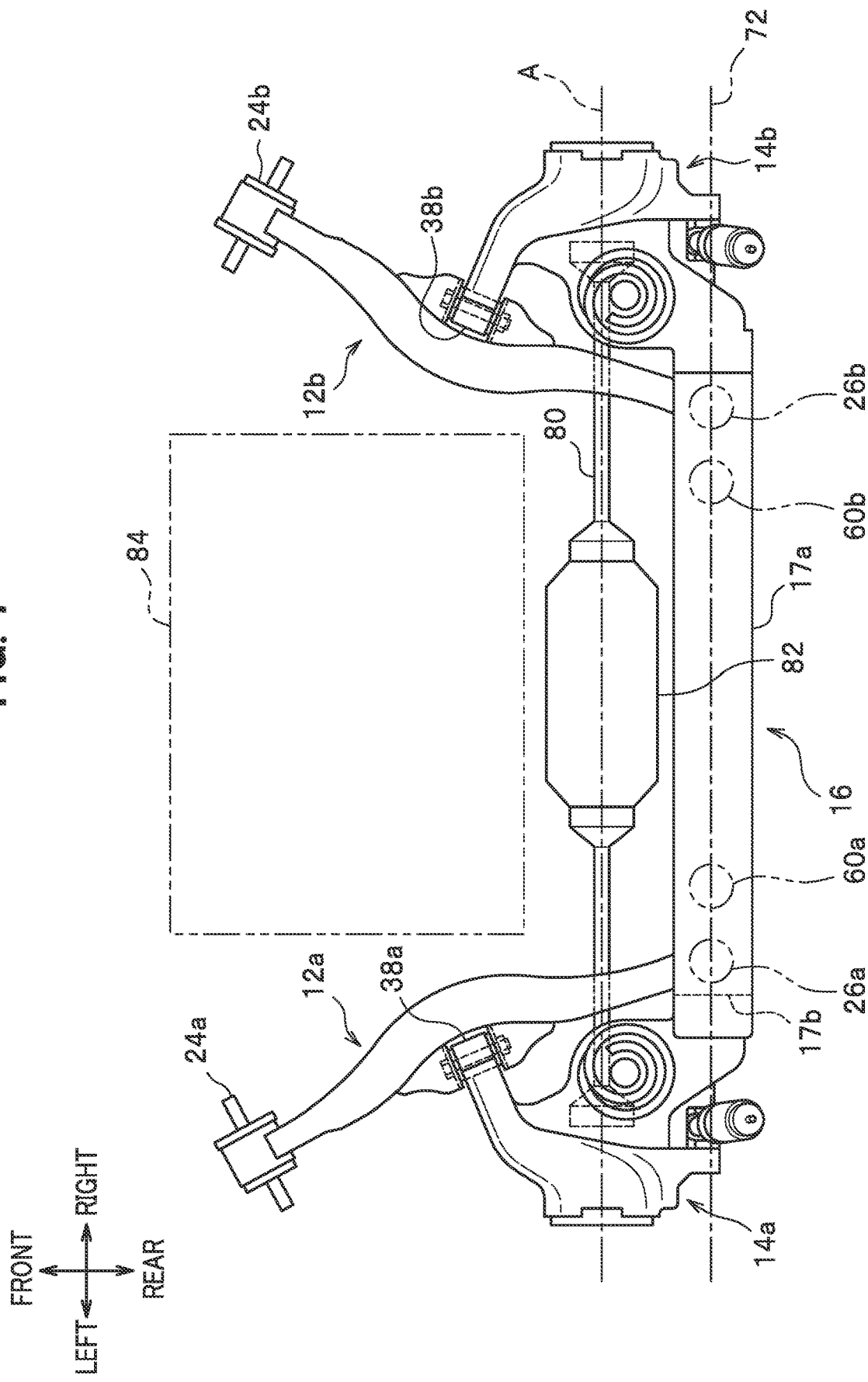
FIG. 7 is a plan view of the rear suspension to which the rear suspension structure according to another embodiment of the present invention is applied.

FIG. 7 is a plan view of the rear suspension to which the rear suspension structure according to another embodiment of the present invention is applied.

In another embodiment shown in FIG. 7, a drive shaft 80 is provided on the axis A of the rear wheels. The drive shaft 80 extends through the left and right trailing arms 12a, 12b and is rotatably supported relative to the left and right hub carriers 14a, 14b. Bearing means such as bearing (not shown) are arranged at both ends of the drive shaft 80. A motor unit 82 for rotating and driving the drive shaft 80 is disposed in a middle portion of the drive shaft 80.

In the embodiment shown in FIG. 7, the drive shaft 80 is supported by passing through the trailing arms 12 and the hub carrier 14, so that the installation space 84 for a battery or other equipment can be provided between the pair of left and right trailing arms 12a, 12b. This arrangement can achieve a space-saving benefit.

Figure 8:
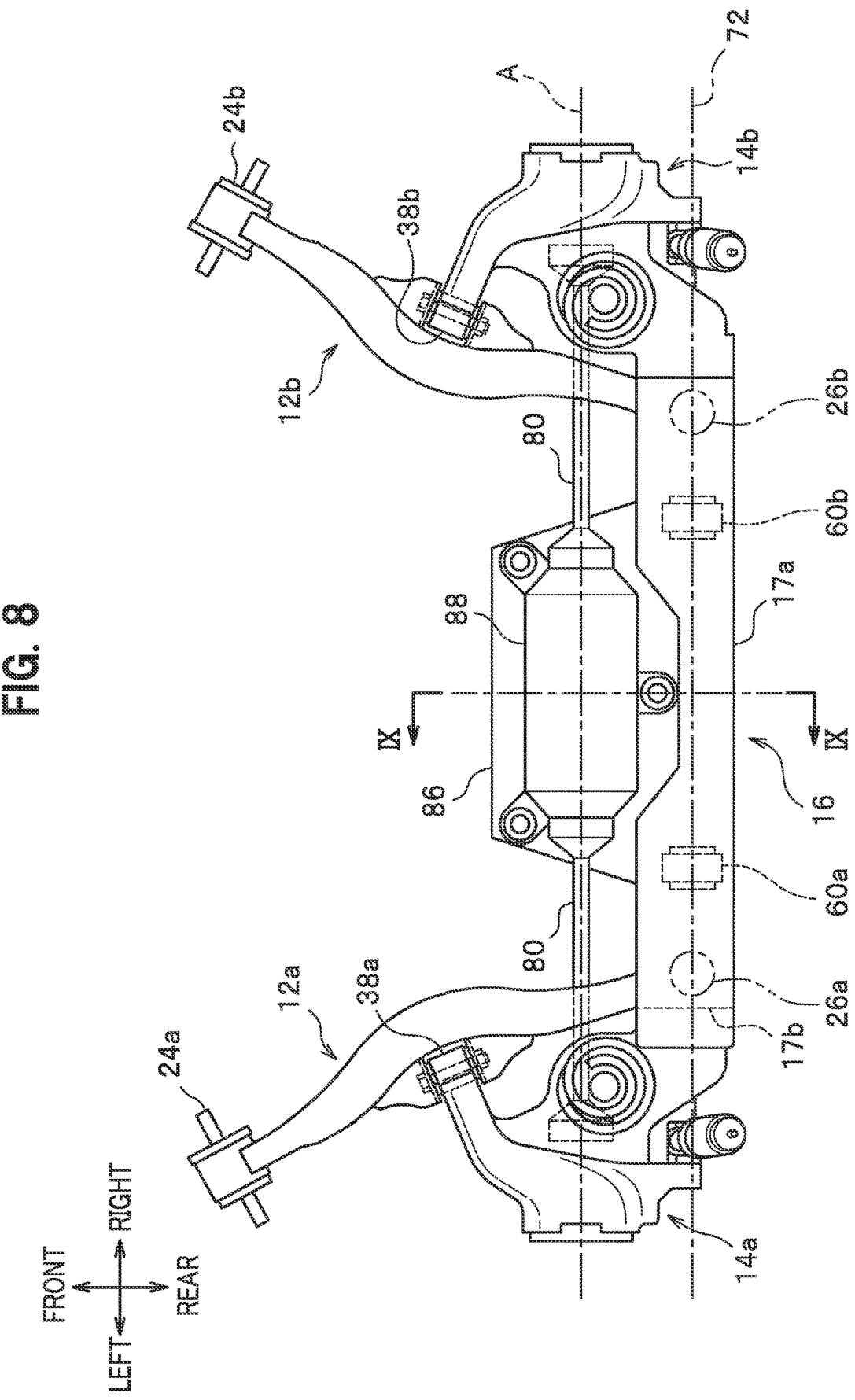
FIG. 8 is a plan view of the rear suspension to which the rear suspension structure according to a further embodiment of the present invention is applied.
Figure 9:
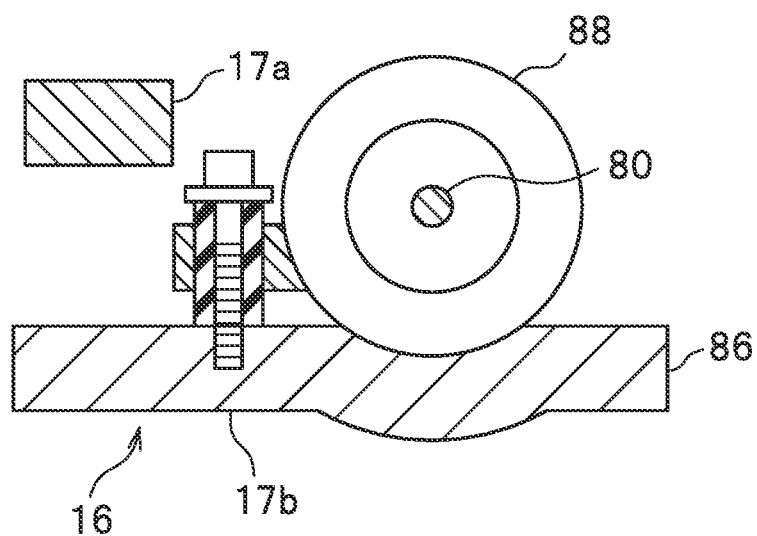
FIG. 9 is a cross-sectional view taken along the line IX-IX of FIG. 8.
Figure 9:
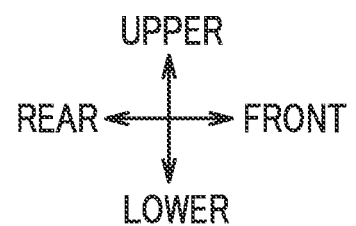
Figure 10:
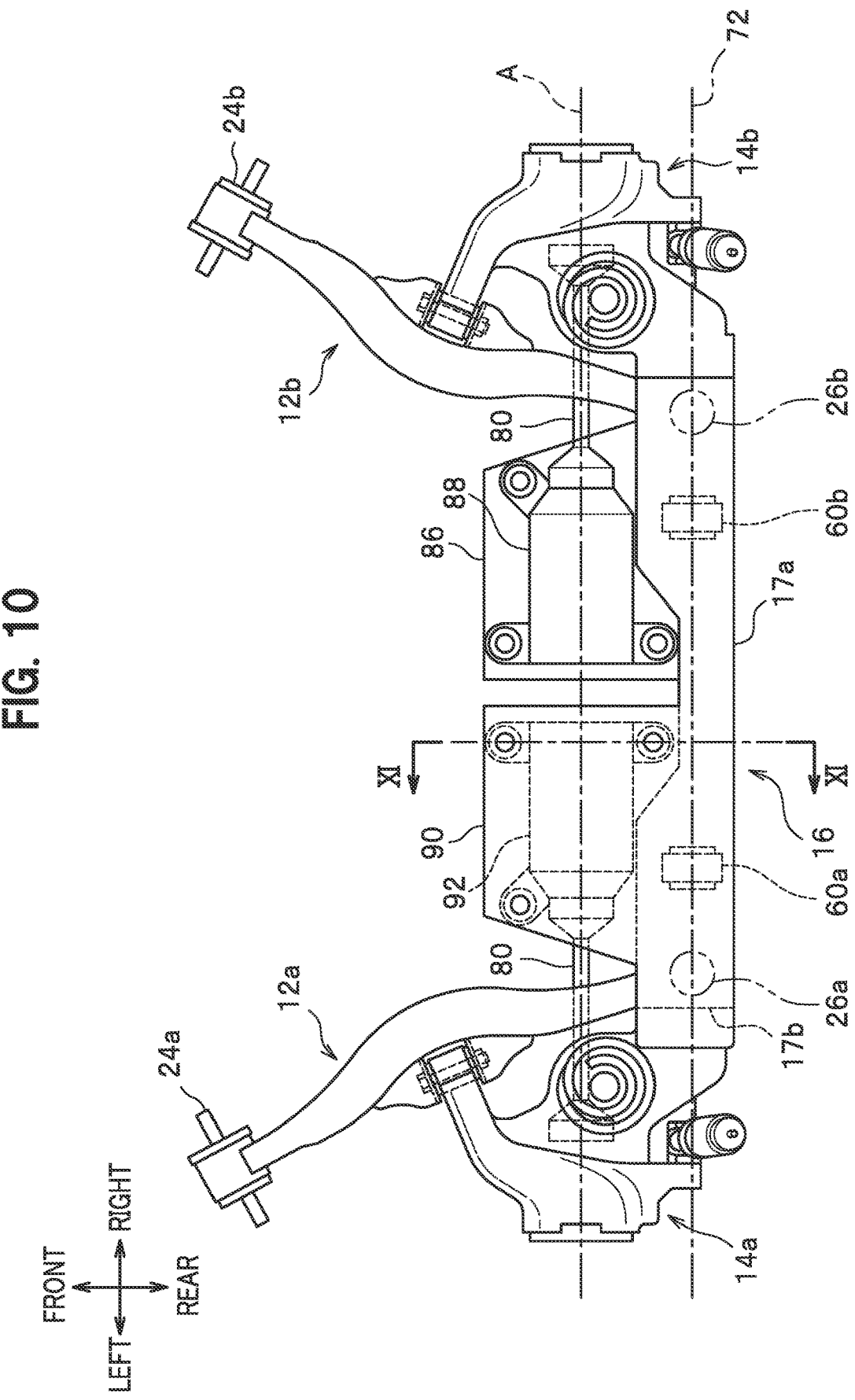
FIG. 10 is a plan view of the rear suspension to which the rear suspension structure according to a further embodiment of the present invention is applied.
Figure 11:
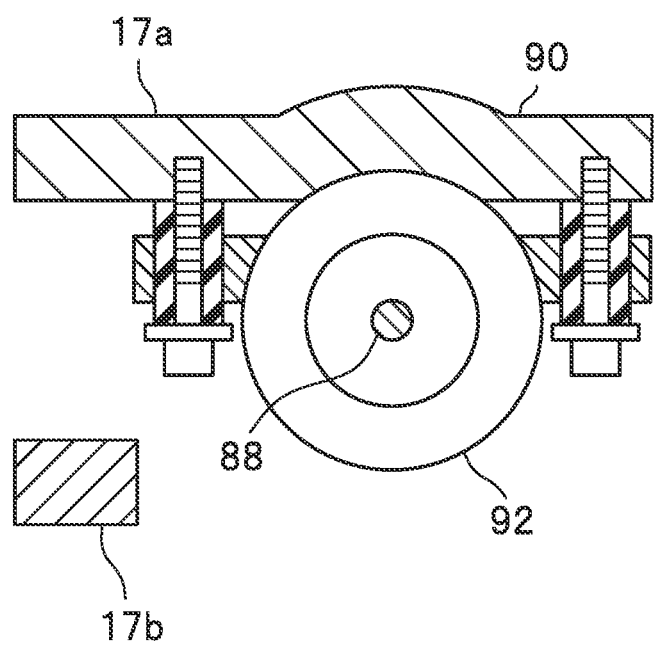
FIG. 11 is a cross-sectional view taken along the line XI-XI of FIG. 10.
Figure 11:
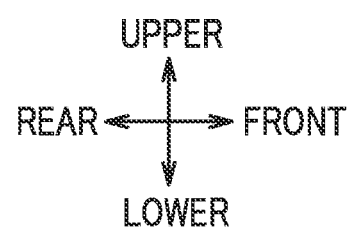

FIG. 8 is a schematic plan view of the rear suspension to which the rear suspension structure according to a further embodiment of the present invention is applied. FIG. 9 is a cross-sectional view taken along the line IX-IX of FIG. 8. FIG. 10 is a schematic plan view of the rear suspension to which the rear suspension structure according to a further embodiment of the present invention is applied. FIG. 11 is a cross-sectional view taken along the line XI-XI of FIG. 10.

In the further embodiment shown in FIGS. 8 and 9, a motor mounting portion 86 extending toward the front side of the vehicle is integrally provided on the right beam 17b that constitutes the lateral beam 16. A single motor unit 88 is fastened and fixed to the upper surface of the motor mounting portion 86.

According to the further embodiment shown in FIGS. 8 and 9, the motor unit 88 is mounted on one beam (the right beam 17b) via the motor mounting portion 86, so that the amount of vertical displacement between the outboard of the drive shaft 80 and the motor unit 88 can be restricted, and the swing angle of the drive shaft 80 is made smaller. As a result, according to the further embodiment shown in FIGS. 8 and 9, a constant velocity joint (not shown) connected to the drive shaft 80 can be made smaller and improve the durability.

Further, in the further embodiment shown in FIGS. 8 and 9, the single motor unit 88 can be installed without increasing the number of body fastening points, and vehicle bodies (bodies) can be commonized (shared) between front-wheel drive vehicle (see FIGS. 8 and 9) and four-wheel drive vehicle (see FIGS. 10 and 11).

In the further embodiment shown in FIGS. 10 and 11, in addition to the motor unit 88 mounted on the right beam 17b, another motor mounting portion 90 extending toward the front side of the vehicle is integrally provided on the left beam 17a that constitutes the lateral beam 16. Another motor unit 92 is fastened and fixed to the lower surface of this another motor mounting portion 90. In other words, the further embodiment shown in FIGS. 10 and 11 differs from the embodiment shown in FIGS. 8 and 9 in that the motor units 88, 92 are mounted on the left beam 17a and the right beam 17b.

According to the further embodiment shown in FIGS. 10 and 11, since the different motor units 88, 92 are mounted on the left beam 17a and on the right beam 17b, it is possible to suppress the amount of relative displacement between the motor units 88, 92 and the hub carriers 14 due to the oscillating motion of the rear suspension 10. This can eliminate the need for oscillating displacement of the drive shaft 80, which leads to simplification of the rear suspension structure, improvement of space efficiency, and improvement of the durability. Further, in the further embodiment shown in FIGS. 10 and 11, the plurality of motor units 88, 92 can be installed without increasing the number of body fastening points, and vehicle bodies (bodies) can be commonized (shared) between front-wheel drive vehicle (see FIGS. 8 and 9) and four-wheel drive vehicle (see FIGS. 10 and 11).

Figure 12:
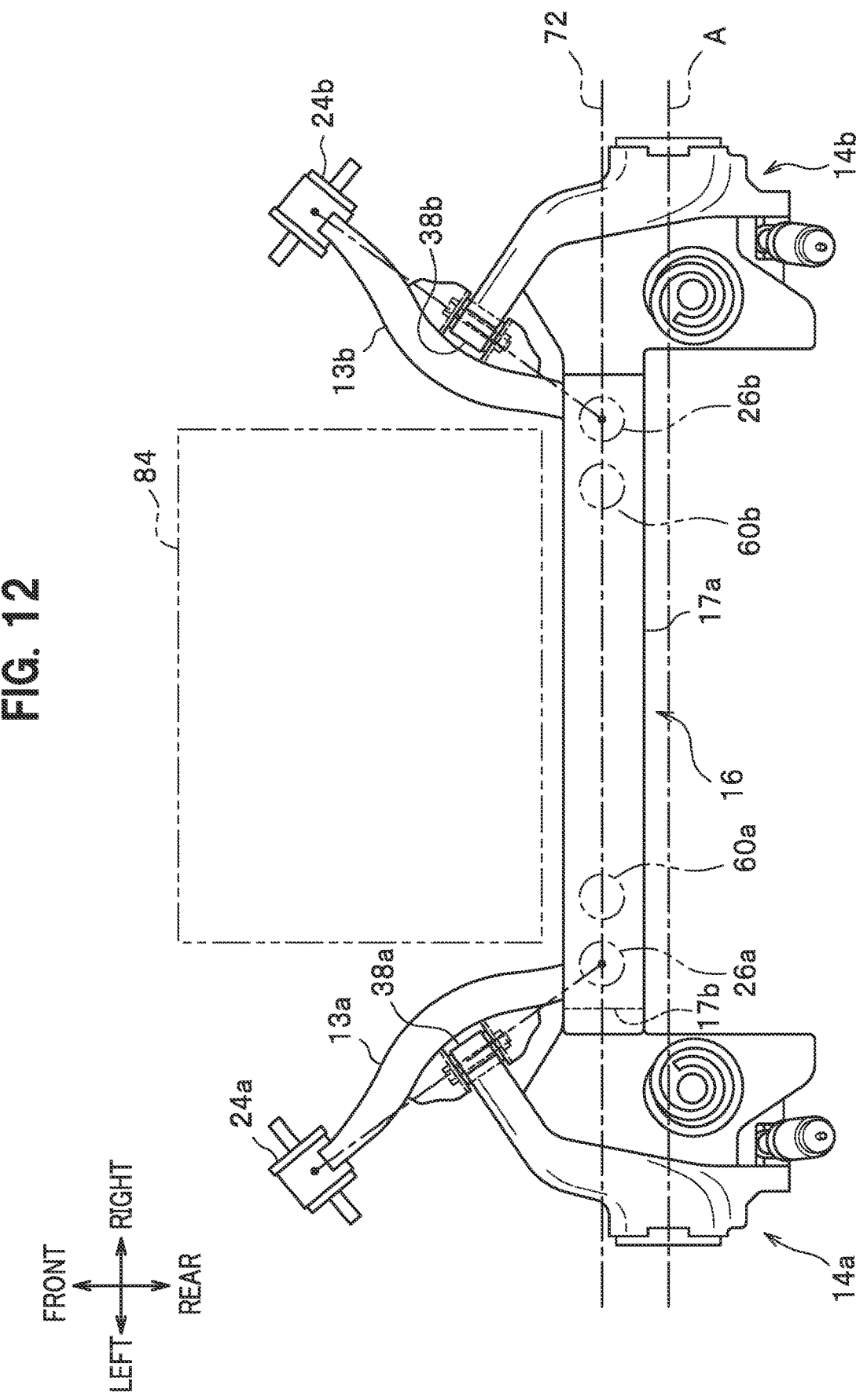
FIG. 12 is a plan view of the rear suspension to which the rear suspension structure according to a further embodiment of the present invention is applied.

FIG. 12 is a schematic plan view of the rear suspension to which the rear suspension structure according to a further embodiment of the present invention is applied.

In the further embodiment shown in FIG. 12, the lateral beam 16 includes the first coupling portions and the second coupling portions. This embodiment differs from the above-described embodiments in that the first coupling portions and the second coupling portions are arranged frontward of the axis A of the rear wheels. According to the further embodiment shown in FIG. 12, the dimension of the pair of left and right trailing arms 12a, 12b along the front-rear direction of the vehicle is made short, and the angle of the V-shaped extension can be increased without reducing the lateral dimension of the installation space 84 for a battery or other equipment. As a result, in the further embodiment shown in FIG. 12, the toe-in characteristic is increased, for example, when a lateral force is input during the vehicle turning, so that stability of the vehicle can be improved.

Figure 13:
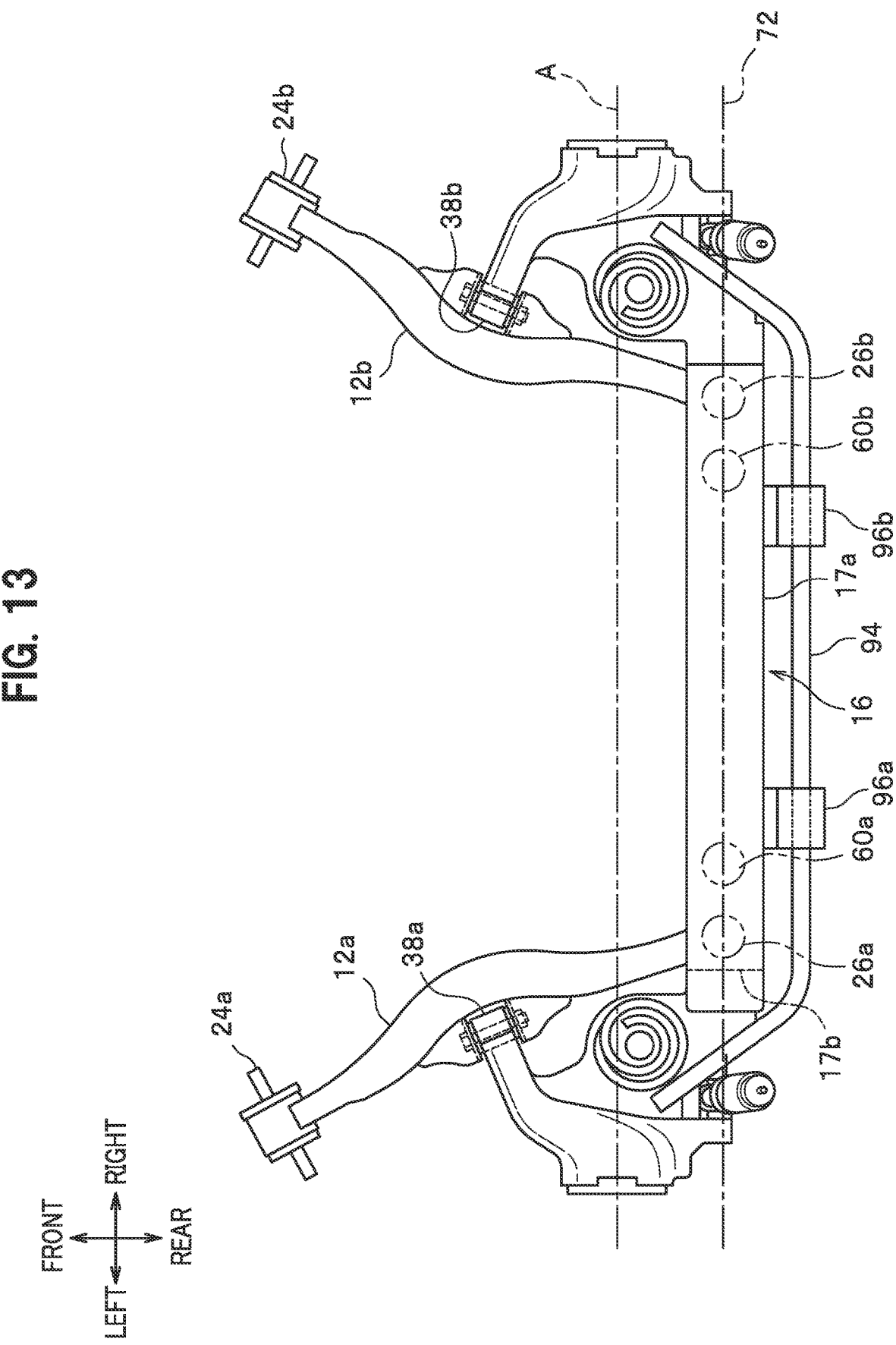
FIG. 13 is a plan view of the rear suspension to which the rear suspension structure according to a further embodiment of the present invention is applied.

FIG. 13 is a schematic plan view of the rear suspension to which the rear suspension structure according to a further embodiment of the present invention is applied.

The further embodiment shown in FIG. 13 differs from the above-described embodiments in that a stabilizer 94 is arranged in the vehicle width direction spanning across the pair of left and right hub carriers 14a, 14b. The stabilizer 94 is supported by a pair of support blocks 96a, 96b connected to the lateral beam 16. Providing the stabilizer 94 makes it possible to reinforce the torsional rigidity of the lateral beam 16. As a result, in the further embodiment shown in FIG. 13, the ride comfort of the vehicle can be enhanced, while suppressing rolling that occurs in corners and sway of the vehicle during the vehicle driving.

According to the rear suspension structure as described in one or more embodiments of the present invention, a good balance between the amount of torsion of the lateral beam 16 (the left beam 17a and the right beam 17b) and the amount of displacement of the trailing arms 12a, 12b can be kept. This can further contribute to improvement in rigidity of the vehicle body.

Although the present invention has been described in detail with reference to the above-described embodiments and modifications, the present invention is not limited to these specific embodiments. It is to be understood that various changes and modifications may be made without departing from the scope of the present invention.

What is claimed is:

1. A rear suspension structure configured to support rear wheels of a vehicle, the rear suspension structure comprising:
   a pair of left and right trailing arms extending in a front-rear direction of the vehicle and each having a front end portion supported by the vehicle;
   a pair of left and right hub carriers each having a wheel support portion, by which a rear wheel is rotatably supported; and
   a lateral beam extending in a vehicle width direction of the vehicle, wherein
   each of the hub carriers includes a front arm portion that extends in a direction inward in the vehicle width direction and frontward of an axis of the rear wheels, and a rear arm portion that extends rearward of the front arm portion,
   the front arm portion is coupled to a front arm attachment portion provided in the trailing arm,
   the lateral beam connects the left and right rear arm portions,
   each of the left and right trailing arms has a rear end portion, and the rear end portion is coupled to at least one of the hub carrier and the lateral beam via a first coupling portion that is a bushing, and
   the lateral beam includes a left beam extending inward in the vehicle width direction from the rear arm portion disposed on a left side of the vehicle, a right beam extending inward in the vehicle width direction from the rear arm portion disposed on a right side of the vehicle, and a pair of left and right second coupling portions configured to displaceably couple the left beam and the right beam that are arranged one over another.

2. The rear suspension structure according to claim 1, wherein
   the second coupling portions are arranged between a center of the left and right beams in the vehicle width direction and the first coupling portions.

3. The rear suspension structure according to claim 1, wherein
   the second coupling portions are formed of different bushings from those of the first coupling portions, and support shafts of the different bushings are fastened along the vehicle width direction.

4. The rear suspension structure according to claim 1, wherein
   the left beam and the right beam are located rearward of the axis of the rear wheels.

5. The rear suspension structure according to claim 3, wherein
   a relative axis of rotation of the hub carriers is formed by connecting a center of the support shaft of the bushing located on one side along the vehicle width direction and a center of the support shaft of the bushing located on another side along the vehicle width direction, and
   the first coupling portions and the second coupling portions are arranged on the relative axis of rotation.

6. The rear suspension structure according to claim 1, wherein
a drive shaft is provided on the axis of the rear wheels, and
the drive shaft extends through the trailing arms and is rotatably supported relative to the hub carriers.

7. The rear suspension structure according to claim 1, wherein
a drive shaft is provided on the axis of the rear wheels, and
the drive shaft is rotatably supported by at least one of the left and right beams.

8. The rear suspension structure according to claim 1, wherein
the first coupling portions and the second coupling portions are arranged frontward of the axis of the rear wheels.

9. The rear suspension structure according to claim 1, wherein
a stabilizer is arranged spanning across the pair of left and right hub carriers.

10. The rear suspension structure according to claim 2, wherein
the second coupling portions are arranged closer to the first coupling portions than the center of the left and right beams in the vehicle width direction.

* * * * *